June 6, 1950   R. S. AMES   2,510,304
APPARATUS FOR CENTRIFUGALLY FORMING CANOPIES,
OR THE LIKE, OF V-TYPE CROSS-SECTIONS
Filed April 1, 1949
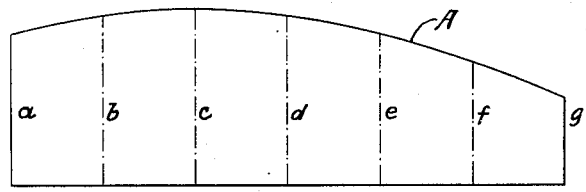
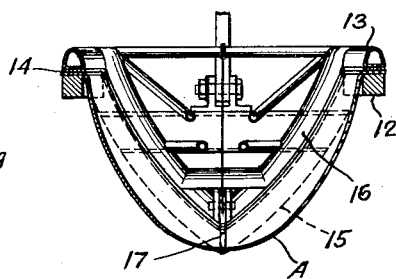
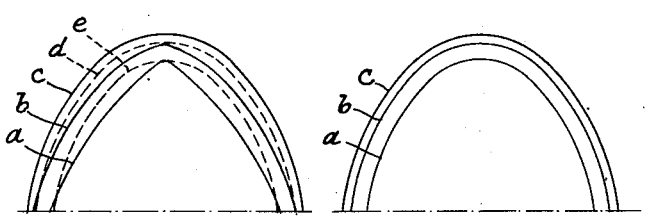
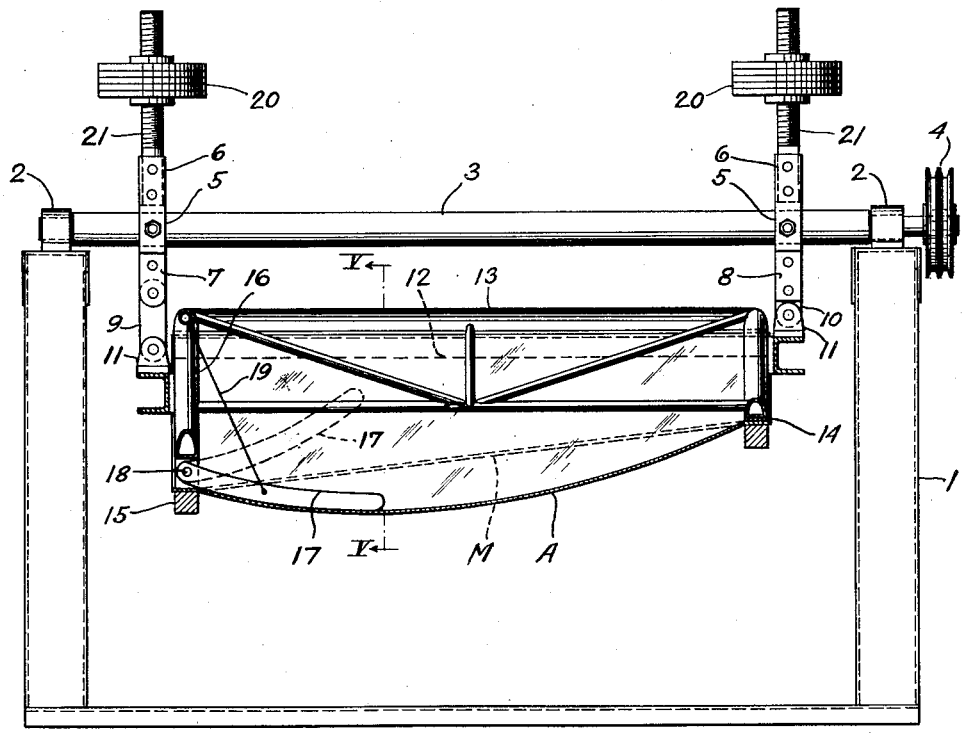
INVENTOR.
Robert S. Ames
BY
H. H. Oldham
ATTORNEY Patented June 6, 1950

2,510,304

UNITED STATES PATENT OFFICE 2,510,304

APPARATUS FOR CENTRIFUGALLY FORMING CANOPIES, OR THE LIKE, OF V-TYPE CROSS SECTIONS

Robert S. Ames, Akron, Ohio, assignor to Goodyear Aircraft Corporation, Akron, Ohio, a corporation of Delaware Application April 1, 1949, Serial No. 84,936

8 Claims. (Cl. 18—19)

This invention relates to apparatus for centrifugally forming of thermoplastic sheet material, canopies, and the like, for aircraft and in particular to an apparatus adapted to form canopies having V-shaped cross-section at least within a portion of their length.

In the Patent No. 2,448,492 of Robert Mayne, and Patent No. 2,448,274 of M. P. H. Peterson, apparatus for centrifugal forming of canopies having substantially semi-circular or parabolical cross-sections are described and illustrated, and of which this invention is a modification.

For airplanes, having windshields of V-shaped cross-section, the front portion of a canopy connected therewith, in order to form a smooth and streamlined continuation thereof, must have, for at least a certain length, a similar cross-sectional shape which may fair rearwardly into a different shape. To accomplish this effect automatically by centrifugal forming, an additional feature, according to the invention, to be used in connection with either one of the above mentioned patented apparatus, has been developed.

It is the general object of the invention to provide an apparatus for centrifugally forming of thermoplastic sheet material a canopy, or the like, having V-shaped cross-sections within at least a portion of its length and fairing this portion into the remaining portion thereof having substantially round or parabolical cross-sections.

Another object of the invention is to provide in an apparatus for centrifugally forming of thermoplastic sheet material a canopy, or the like, having V-shaped cross-sections, the rotatable jig determining the edge contours of the canopy with means for shaping by centrifugal force, at least within a portion of the canopy length, the otherwise round or parabolical cross-sections of the canopy into V-shaped cross-sections fairing into the remaining portion thereof.

The aforesaid objects of the invention, and other objects which will become apparent as the description proceeds, are achieved by pivotally mounting near the top and in the center of the V-shaped front portion of the rotatable jig, which determines the contour of the edge portions of the canopy, a longitudinal bar of desired length substantially shaped to the apex contours of the finished canopy and which, while the jig is being rotated, is centrifugally forced outwardly against the sheet material to be formed into a canopy for having it assume varying V-shaped cross-section substantially the length of the bar and to fair into the cross-section rearwardly thereof.

For a better understanding of the invention reference should be had by the accompanying drawing, wherein Fig. 1 shows diagrammatically a longitudinal side view of a canopy.

Fig. 2 shows various cross-sectional views taken on lines a, b, c, d and e of Fig. 1 of a canopy formed with an apparatus according to the invention, Fig. 3 shows, for comparison with Fig. 2, similar views taken on lines a, b and c of a canopy formed with an apparatus prior to the invention.

Fig. 4 shows a side view, partly in cross-section, of one embodiment of the invention, and Fig. 5 shows a cross-sectional view of the forming jig taken on line V—V of Fig. 4.

Although the invention when applied either to a female forming jig as in Patent No. 2,448,274, or to a male forming jig as in Patent No. 2,448,274, there is no principal difference in its construction and, therefore, the invention is illustrated only in connection with the former type jig, in both the centrifugal bar or arm is attached to the male portion of the jig.

Referring more specifically to the drawing, the Figures 1, 2 and 3 show a canopy to be formed by the apparatus illustrated and of which Fig. 2 shows several cross-sectional views of a canopy made with the apparatus, according to the invention, and for comparison, similar views of a canopy having conventional cross-sectional contours.

The numeral 1 indicates a supporting frame upon which is rotatably mounted in bearing 2 a shaft 3 driven by pulleys 4 from a motor, not shown. The shaft 3 has bolted or otherwise fastened thereto a pair of split collars 5, one having extending therefrom in opposite direction lugs 6 and 7, and the other one 6 and 8. Between and to the lugs 7 is pivotally attached a link 9 and between and to the lugs 8 a fixed end piece 10. From the link 9 and the end piece 10 is suspended by brackets 11 on the female portion 12 of the forming jig into which is draped in hot condition the thermoplastic canopy material M formed into an article A and secured therein around the edges by the male jig portion 13, usually against a soft liner 14, by any suitable clamping means, not shown. This arrangement is in principle the same as the construction shown in Patent No. 2,448,274, however with the difference that at their apex the end frames 15 and 16 of the female and male jig portions, respectively, are not curved but pointed so that the shape at this end of the canopy will conform to that of a V-shaped wind shield of an airplane to which it is to be attached. In order to continue the V-shape within a desired length by centrifugal forming and to fair it into the remaining portion of the canopy, which in cross-section has a rounded top, a bar or arm 17 curved to the final shape of the longitudinal center contour of the canopy and of proper weight is pivotally mounted with one end at 18 to the center of the male end frame 16 and outward movement of the other end is restricted by a cord 19 attached to some point of frame 16, or by any other means. Counterweights 20 adjustable on threaded extensions 21 radially to the shaft 3, which are inserted between and fastened to the lugs 6, serve to balance the weight of the jig, together with that of the work material.

In operating the apparatus, that is, by rotating the jig having the hot work material inserted therein, the bar 17, as shown in dotted lines will be thrown by centrifugal force outwardly against the inside of the work material and form it therealong into V-shaped cross-section fairing into a curved shape produced merely by centrifugal force without use of any mechanical shaping means.

It will be recognized that the objects of the invention to produce a canopy, or the like, having V-shaped cross-section, at least for a portion of the canopy length, have been achieved. Moreover, it should be understood an apparatus according to the invention also would be applicable for obtaining a canopy of other than V-shaped by changing the centrifugal weight or bar accordingly.

While certain representative embodiments and details have been shown for the purpose of illustrating the invention, it will be apparent to those skilled in the art that various changes and modifications may be made therein without departing from the spirit or scope of the invention.

What I claim is:

1. Apparatus for centrifugally forming a transparent thermoplastic sheet into a streamlined canopy or the like, said apparatus being of the type including a jig for supporting the sheet adjacent its edges only and having substantially the entire center unsupported, means for rotating the jig about an axis to impart the desired shape to the unsupported portion of the sheet, said jig being characterized by a substantially V-shaped support portion adjacent the front of the canopy to be formed and by a spaced substantially U-shaped support portion on the jig adjacent the rear of the canopy to be formed, and a bar carried in association with the jig and movable by centrifugal force into engagement with the sheet adjacent the V-shaped support portion on the jig, said bar being positioned to impart a substantially V-shape in transverse section to the front portion of the canopy which blends into the U-shape of the canopy towards the rear.

2. Apparatus for centrifugally forming a transparent thermoplastic sheet into a streamlined canopy or the like, said apparatus being of the type including a jig for supporting the sheet adjacent its edges only and having substantially the entire center unsupported, means for rotating the jig about an axis to impart the desired shape to the unsupported portion of the sheet, said jig being characterized by a substantially V-shaped support portion adjacent the front of the canopy to be formed and by a spaced substantially U-shaped support portion on the jig adjacent the rear of the canopy to be formed, and a bar-like means carried in association with the jig and movable by centrifugal force into engagement with the sheet adjacent the V-shaped support portion on the jig.

3. Apparatus for centrifugally forming a transparent thermoplastic sheet into a streamlined canopy or the like, said apparatus being of the type including a jig for supporting the sheet adjacent its edges only and having substantially the entire center unsupported, means for rotating the jig about an axis to impart the desired shape to the unsupported portion of the sheet, said jig being characterized by a bar carried in association with the jig and movable substantially laterally by centrifugal force into the sheet to form a portion thereof to approximate V-shape in sections taken substantially perpendicular to the bar and spaced along the bar.

4. In an apparatus for centrifugally forming a thermoplastic sheet into a streamlined canopy, or the like, a jig rotatable about a longitudinal axis and being radially spaced therefrom for holding said sheet only along its edges and thereby determining the edge contours of the canopy having substantially V-shaped cross-section at the front and substantially U-shaped cross section at the rear, means for rotating said shaft, and bar means inside of and fulcrumed at one end near the top of the jig front portion, said bar means being shaped substantially to the longitudinal center contour of the front portion of the canopy to be centrifugally forced against the inside of the sheet to be formed transversely into V-shaped cross-sections fairing rearwardly thereof into the U-shaped portion of the canopy while the jig is being rotated.

5. In an apparatus for centrifugally forming a thermoplastic sheet into a streamlined canopy having bottom, front and rear edges, or the like, a rotatably mounted shaft, a jig radially spaced from and supported in fixed relation by said shaft for supporting said sheet around its edges and determining only the contours of the edge portions of the canopy and which when rotated forms the cross-sectional contours of the canopy, and bar means longitudinal of and in the center of said jig being swingably attached to the front thereof and which during jig rotation is forced centrifugally against the sheet to modify for a desired length the cross-sectional U-shape of the canopy into a substantially V-shaped cross-section, both portions fairing into each other.

6. In an apparatus for centrifugally forming a thermoplastic sheet into a streamlined canopy, having bottom, front and rear edges, or the like, a rotatably mounted shaft, a jig radially spaced from and supported in fixed relation by said shaft for supporting said sheet around its edges and determining only the contours of the edge portions of the canopy and which when rotated forms the cross-sectional contours of the canopy and bar means longitudinal of and in the center of said jig and being swingably attached to the front thereof and which during jig rotation is forced centrifugally against the sheet to modify for a desired length the cross-sectional U-shape of the canopy into a cross-section substantially different from said U-cross-section, both portions fairing into each other.

7. In an apparatus for centrifugally forming a thermoplastic sheet into a streamlined canopy, or the like, a jig rotatable about a longitudinal axis and being radially spaced therefrom for holding said sheet only along its edges and thereby determining the edge contours of the canopy, the cross-sectional contours thereof being obtained by rotating the jig the front end of which is substantially V-shaped and the rear end substantially U-shaped in cross-section, and bar means swingably attached to the top front end and longitudinally of said jig for substantially modifying at least for a portion of its length the cross-sectional shape of the canopy ordinarily obtained by the centrifugal action of said bar means.

8. In an apparatus for centrifugally forming a thermoplastic sheet into a streamlined canopy, or the like, a jig rotatable about a longitudinal axis and being radially spaced therefrom for holding said sheet only along its edges and thereby determining the edge contours of the canopy, the cross-sectional contours thereof being obtained by rotating the jig the front end of which is substantially V-shaped and the rear end substantially U-shaped in cross-section, bar means swingably attached to the top front end and longitudinally of said jig for substantially modifying at least for a portion of its length the cross-sectional shape of the canopy ordinarily obtained by the centrifugal action of said bar means, and stop means for limiting centrifugal motion of said bar means.

ROBERT S. AMES.

No references cited.